D. W. George.
Auger Handle.
No. 95,220. Patented Sep. 28, 1869.
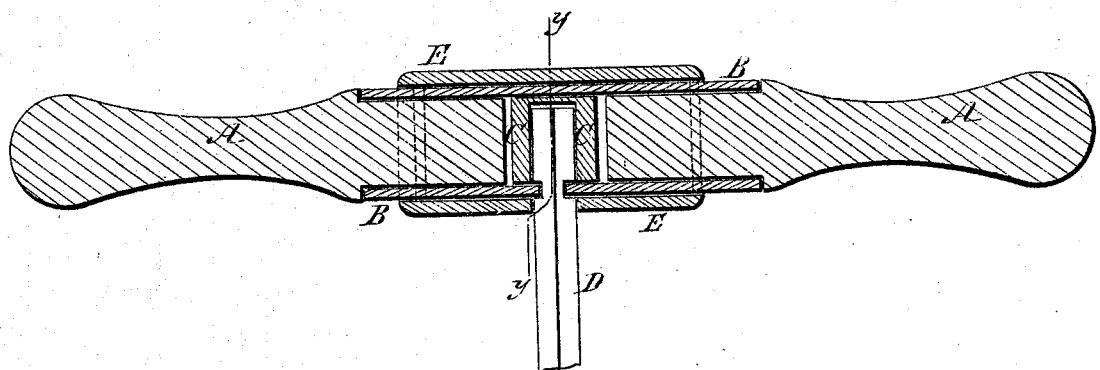
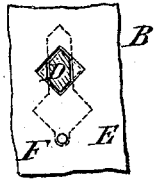
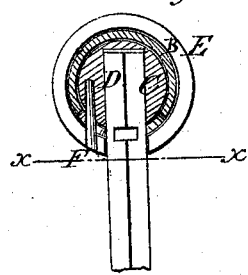
Witnesses
Chas. Nida
Wm A Morgan
Inventor
D. W. George
per Munn & Co.
Attys

United States Patent Office.

DAVID W. GEORGE, OF MINNESOTA CITY, (TOWN OF ROLLING STONE,) MINNESOTA.

Letters Patent No. 95,220, dated September 28, 1869; antedated September 18, 1869.

IMPROVEMENT IN AUGER-HANDLES.

The Schedule referred to in these Letters Patent and making part of the same.

*To all whom it may concern:*

Be it known that I, DAVID W. GEORGE, of Minnesota City, in the town of Rolling Stone, in the county of Winona, and State of Minnesota, have invented a new and improved Auger-Handle; and I do hereby declare that the following is a full, clear, and exact description thereof, which will enable others skilled in the art to make and use the same, reference being had to the accompanying drawings, forming part of this specification, in which—

Figure 1 is a longitudinal section of my improved auger-handle.

Figure 2 is a detail view of the locking slots, partly in section, through the line $x$ $x$, fig. 3.

Figure 3 is a detail cross-section of the same, taken through the line $y$ $y$, fig. 1.

Similar letters of reference indicate corresponding parts.

My invention has for its object to furnish a simple, convenient, and reliable auger-handle, which shall be so constructed and arranged that the auger may be conveniently and quickly detached from the handle, so that only one handle will be required for a full set of augers; and It consists in the construction and combination of the various parts of the handle, by means of which the auger is secured to said handle, as hereinafter more fully described.

A is the wooden part of the handle, which is made in two parts or pieces, as shown in fig. 1.

The inner ends of the parts of the handle A, are inserted and secured in the ends of the tube or wide band B.

C is a cylindrical block, placed in the middle part of the band or tube B, and which is made with a square hole or socket, into which fits the upper end of the shank of the auger D.

E is a tube or wide band, fitting upon the tube or band B, to which the wooden handle A is secured.

The tube or band E is made with a square hole in one side, to receive the square upper end of the auger-shank D.

The cylindrical block C, and outer tube or band E, are connected to each other by a pin or screw, F, in such positions that the square holes in the said block and tube may be in a line with each other, and so that they may move together or remain stationary, while the other parts of the handle are moved or revolved, the said pin passing through the slot in the tube B, by which the movement is limited.

In the side of the tube B is formed a square hole, to receive the shank of the auger D, which said hole is extended into a narrow slot upon one side, as shown in dotted lines in fig. 2.

Upon the opposite or diagonal corners of the auger-shank D are formed transverse grooves, as shown in figs. 1, 2, and 3, in such positions that when the said shank D is inserted in its place, the said grooves, as the handle A and band or tube B are turned, may receive the edges of the slotted band or tube B, securely locking the said shank D in place in the handle.

Having thus described my invention,

What I claim as new, and desire to secure by Letters Patent, is—

An improved auger-handle, formed by the combination of the handle A, made in two parts, tube or band B, cylindrical block C, and band or tube E, with each other, said parts being constructed and operating substantially as herein shown and described, and for the purpose set forth.

The above specification of my invention signed by me, this 4th day of November, 1868.

DAVID W. GEORGE.

Witnesses:
EDGAR CHAPMAN,
EGBERT CHAPMAN.